United States Patent [19]
Haunschild

[11] 3,803,024
[45] Sept. 4, 1974

[54] CATALYTIC CRACKING PROCESS

[75] Inventor: Willard M. Haunschild, Walnut Creek, Calif.

[73] Assignee: Chevron Research Company, San Francisco, Calif.

[22] Filed: Mar. 16, 1972

[21] Appl. No.: 235,183

[52] U.S. Cl.............. 208/76, 208/DIG. 2, 208/73, 208/74, 208/120, 208/155
[51] Int. Cl............................ B01j 9/20, C10g 11/00
[58] Field of Search.................... 208/76, 74, 120

[56] References Cited
UNITED STATES PATENTS

| | | | |
|---|---|---|---|
| 3,696,023 | 10/1973 | Koch | 208/87 |
| 2,681,304 | 6/1954 | Blanding et al. | 204/74 |
| 3,255,103 | 6/1966 | Fahnestock | 208/120 |
| 3,392,110 | 7/1968 | Payne | 208/120 |
| 2,342,983 | 2/1944 | Thomas | 208/78 |
| 3,201,341 | 8/1965 | Anderson et al. | 208/74 |
| 3,143,491 | 8/1964 | Bergstrom | 208/74 |

*Primary Examiner*—Delbert E. Gantz
*Assistant Examiner*—G. E. Schmitkons
*Attorney, Agent, or Firm*—G. F. Magdeburger; R. H. Davies; J. D. Foster

[57] ABSTRACT

The invention relates to a process for producing increased yield of catalytically cracked product comprising: (a) contacting a hydrocarbon feedstock boiling above about 400°F. with a first catalytic cracking catalyst comprising amorphous silica-alumina, said first catalyst being substantially free of any hydrogenating component and substantially free of any zeolitic molecular sieve component, in a first catalytic cracking zone at catalytic cracking conditions sufficiently severe to convert from about 15 percent to about 75 percent of said feedstock to lower-boiling products; (b) separating the effluent from said first catalytic cracking zone into at least two streams, a stream boiling below a given temperature and a stream boiling above said given temperature; (c) contacting at least a portion of said stream boiling above said given temperature with a second catalytic cracking catalyst comprising a crystalline zeolitic molecular sieve component, said second catalyst being substantially free of any hydrogenating component, in a second catalytic cracking zone at catalytic cracking conditions; and (d) recovering those portions of the effluents from said first and second catalytic cracking zones boiling below said given temperature. Preferably at least a portion of that part of the effluent from said second catalytic cracking zone which boils above said given temperature is recycled to said second catalytic cracking zone. Said given temperature is in the range of from 250° to 460°F., preferably in the range of from 250° to 400°F.

10 Claims, 1 Drawing Figure

PATENTED APR 9 1974        3,803,024
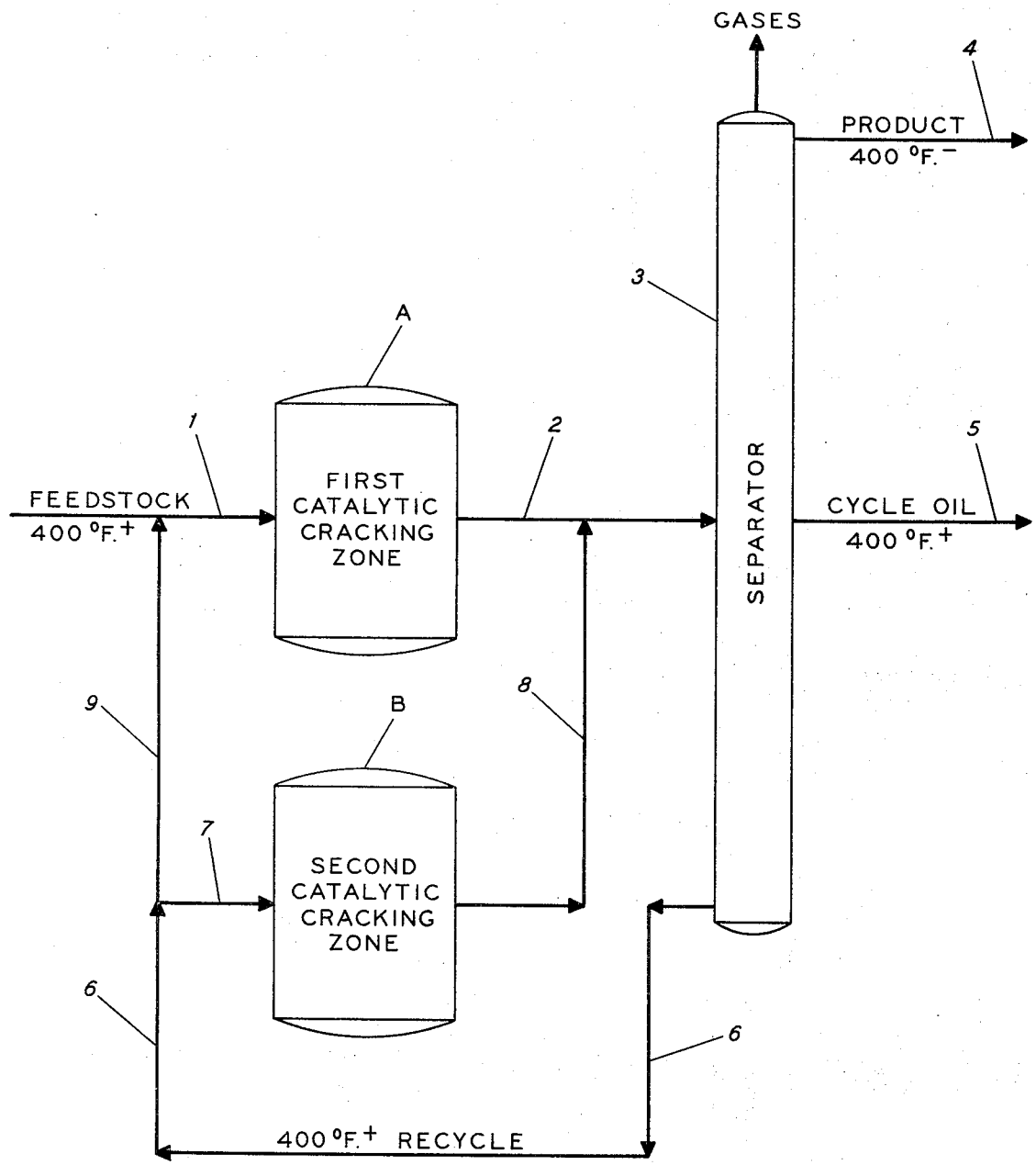

CATALYTIC CRACKING PROCESS

BACKGROUND OF THE INVENTION

1. Field

The present invention is concerned with an improved catalytic cracking process.

2. Prior Art

Catalytic cracking is a well-known process for producing relatively low-boiling and valuable hydrocarbons from a relatively high-boiling hydrocarbon feedstock. It is well knwon in the prior art to use as the catalyst for a catalytic cracking process an amorphous silica-alumina catalyst, a crystalline zeolitic molecular sieve catalyst, catalysts comprising various physical mixtures of amorphous silica-alumina and a crystalline zeolitic molecular sieve and catalysts comprising crystalline zeolitic molecular sieves in a gel matrix comprising silica and alumina.

The prior art does not teach that by operating by the process of the present invention an increased yield of olefins for alkylation and an increased yield of high-octane gasoline over a single-stage process using a crystalline zeolitic molecular sieve catalyst can be obtained. Nor does the prior art teach that reduced yields of coke and gas can be obtained.

SUMMARY OF THE INVENTION

In accordance with the present invention, a process is set out for producing increased yield of catalytically cracked product comprising:

a. contacting hydrocarbon feedstocks boiling above about 400° F. with a first catalytic cracking catalyst comprising amorphous silica-alumina, said first catalyst being substantially free of any hydrogenating component and substantially free of any crystalline zeolitic molecular sieve component in a first catalytic cracking zone at catalytic cracking conditions sufficiently severe to convert from about 15 percent to about 75 percent of said feedstock to lower-boiling product, b. separating the effluent from said first catalytic cracking zone into at least two streams a stream boiling below a given temperature and a stream boiling above said given temperature;

c. contacting at least a portion of said stream boiling above said given temperature with a second catalytic cracking catalyst comprising a crystalline zeolitic molecular sieve component, said second catalyst being substantially free of any hydrogenating component, in a second catalytic cracking zone at catalytic cracking conditions; and d. recovering those portions of the effluents from said first and second catalytic cracking zones boiling below said given temperature. Preferably at least a portion of that part of the effluent from said second catalytic cracking zone which boils above said given temperature is recycled to said second catalytic cracking zone.

By an increased yield of catalytically cracked product it is meant an increased yield of: (1) olefins which can be used for alkylation; and (2) gasoline. Generally, gasoline will be produced by the process of the present invention in higher yield than will gasoline produced from the same feedstock by a conventional single-stage catalytic cracking process using a crystalline zeolitic molecular sieve catalyst.

DESCRIPTION OF THE DRAWING

The present invention will be better understood and will be further explained hereinafter by reference to the figure.

The figure is a flow diagram illustrating one embodiment of the process of the present invention.

DETAILED DESCRIPTION OF THE INVENTION

THE HYDROCARBON FEEDSTOCK

The hydrocarbon feedstock useful in the present invention will generally boil above about 400° F.; preferably the hydrocarbon feedstock will boil in the range from about 450° F. to about 1,000° F.; and more preferably 600° to 1,000° F. When a temperature above 400° F. is utilized as the cutoff point for material contacted with the second catalytic cracking catalyst, obviously a feedstock boiling above the cutoff point is utilized. The hydrocarbon feedstocks may include, for example, light and heavy gas oils obtained from atmospheric distillation, vacuum distillation and coker gas oils. The reaction conditions can be adjusted in each of the two cracking stages according to the conversion level desired therein.

THE CRACKING conditions

In both the first and second catalytic cracking zones utilized in the process of the invention, the temperature at the inlet of the zones will generally fall within the range from about 700° F. to about 1,250° F. The temperature of the first (amorphous silica-alumina catalyst) stage will usually be higher than that of the second (zeolite catalyst) stage. The pressure within the zones will generally fall within the range from about 1 to about 100 psig, preferably 5 to 25. The liquid hourly space velocities within the two catalytic cracking zones will generally fall within the range from about 0.5 to about 50. More generally, these space velocities within the two catalytic cracking zones will fall within the range from about 2 to about 20. The preferred temperatures for use in the two catalytic cracking zones will generally fall within the range from about 850° F. to about 1,050° F.

The catalytic cracking of the present invention may be performed utilizing well-known techniques, including, for example, fluidized bed, fixed bed, or moving bed processes. It is, of course, essential to the practice of the present invention that both catalysts be regenerated, either separately or together. If the two catalysts are regenerated in the same regeneration zone, means must be provided for separating the catalysts so that the catalyst in the first zone always remains substantially free of crystalline zeolitic molecular sieve component. Generally, separate regeneration zones will be used for the catalysts of the first and second catalytic cracking zones.

THE AMORPHOUS SILICA-ALUMINA CATALYST

The amorphous silica-alumina catalysts useful in the first catalytic cracking zone of the present invention are well known to the prior art and will not be discussed in any detail here. It is clear that the essential ingredients of the amorphous silica-alumina catalyst are silica and alumina. The amorphous silica-alumina catalyst may also contain other inorganic oxides, for example magnesia, zirconia, titania, or the like. However, the amorphous silica-alumina catalyst of the first catalytic cracking zone may not contain substantial amounts of a hydrogenating component and may not contain substantial amounts of a crystalline zeolitic molecular sieve component. The amorphous silica-alumina catalyst of the first catalytic cracking zone may be prepared by any desired method. Methods of preparation of amorphous silica-alumina catalysts are also well known in the prior art.

THE CRYSTALLINE ZEOLITIC MOLECULAR SIEVE CATALYST

The crystalline zeolitic molecular sieve catalysts are also well known to the prior art. Such catalysts are disclosed and discussed in great detail, for example, in U.S. Pat. No. 3,210,267 (Plank et al.) and U.S. Pat. No. 3,271,418 (Plank et al.). As is disclosed in these two prior art patents, the crystalline zeolitic molecular sieve component may have included therewith an amorphous matrix, for example, silica-alumina, titania, zirconia, magnesia, and the like. For the purposes of the present invention, the catalyst used in the second catalytic cracking zone must be substantially free of hydrogenating components.

In one preferred embodiment of the invention the catalyst of the second catalytic cracking zone will comprise 1 to 30 weight percent of a crystalline zeolitic molecular sieve component and 70 to 99 weight percent of an amorphous silica-alumina component, said weight percents being based on total second catalyst weight.

DEGREE OF CONVERSION IN FIRST CATALYTIC CRACKING ZONE

It is preferred but not essential to the practice of the present invention that the first catalytic cracking zone be operated on substantially a once-through basis. Thus, large quantities of insufficiently cracked effluent are not generally recycled to said first catalytic cracking zone for further cracking. A portion of the insufficiently cracking effluent may be recycled, primarily to maintain heat balance and proper temperature control within the first zone during operation thereof.

It is essential to the practice of the invention that the conversion of the hydrocarbon feedstock which enters the first catalytic cracking zone to lower-boiling products fall within the range from about 15 percent to about 75 percent of said feedstock. The catalytic cracking conditions in the first catalytic cracking zone must be adjusted to be sufficiently severe to convert from about 15 percent to about 75 percent of the hydrocarbon feedstock to lower-boiling products. More preferably, the catalytic cracking conditions are more narrowly controlled so as to be sufficiently severe to convert from about 25 percent to about 65 percent of the hydrocarbon feedstock to lower-boiling products. By "lower-boiling products" is meant products boiling below a given temperature in the range of from about 250° to about 460° F., as discussed in detail below.

TREATMENT OF THE EFFLUENT FROM THE FIRST CATALYTIC CRACKING ZONE

The effluent from the first catalytic cracking zone is sent to a separator where a stream boiling below a given temperature and at least one stream boiling above a given temperature are obtained. The separating can be carried out by any well-known separating technique, for example, by distillation at reduced, atmospheric, or elevated pressure.

When boiling ranges are specified herein, the temperatures refer to the temperatures at which the feedstock would boil at one atmosphere pressure although the separation may, of course, take place at other than one atmosphere pressure.

PROCESSING IN THE SECOND CATALYTIC CRACKING ZONE

In the second catalytic cracking zone, at least a portion of that stream of the effluent from the first catalytic cracking zone which boils above said given temperature is contacted with a second catalyst comprising a crystalline zeolitic molecular sieve component, said second catalyst being substantially free of any hydrogenating component at catalytic cracking conditions.

The second catalytic cracking zone is not generally operated on a once-through basis; that is, at least a portion of that part of the effluent from the second catalytic cracking zone which boils above said given temperature is normally recycled to said second catalytic cracking zone. However, if two separators are used for the two catalytic cracking zones, it may be desirable to send only the material boiling above said given temperature from the first cracking zone to the second cracking zone while the effluent material boiling above said given temperature from the second cracking zone may be recovered as product or further processed downstream.

PRODUCTS AND PRODUCT RECOVERY

The products obtained from the separator can be varied depending on the contemplated uses. Recently there has been considerable interest in a higher-volatility gasoline. It has been proposed that to meet the 1975 proposed emission standards a gasoline having a boiling point of 300° F., or even as low as 250° F., may be required. This compares with present-day requirements, where gasoline boiling as high as 460° F. is utilized.

If a low-boiling-range gasoline is desired, the separation process step may be carried out to take out an overhead product boiling below 300° F. or 250° F., or whatever given temperature is desired. Therefore, the "said given temperature" referred to herein can range from about 460° F. down to about 250° F., preferably from about 275° to 425° F.

Necessarily the material boiling above "said given temperature" constitutes valuable material which can be sent in its entirety to the second cracking zone or split into a recycle and a product stream or the separation process step can be operated to provide a number of streams each of which can be recycled, drawn off as product or split into a recycle and a product stream. Since the nature and number of these streams will depend on the desired products, no limitation as to the variety and use of these streams is intended. For instance, if 400° F.- gasoline is desired, a light cycle oil stream, heavy cycle oil stream, and a bottoms stream may be obtained with each or any portion thereof being recycled to the second catalytic cracking zone.

While no limitation is placed on which of these streams boiling above "said given temperature" is drawn off as product and which is recycled, the process of the invention requires at least a portion of the material boiling above said given temperature to be fed to the second catalytic cracking zone.

When two separators are utilized, the material boiling above "said given temperature" in the strict sense of the word is not being "recycled" when it is sent to the second catalytic cracking zone, since it has never been there before. Similarly, when a single separator is used, the material boiling above the said given temperature which came from the first cracking zone and is sent to the second cracking zone is not being "recycled." However, for purposes of this specification, the term "recycle" means the material boiling above said given temperature which is sent to the second catalytic cracking zone.

The materials obtained from the catalytic cracking zones boiling above and below said given temperature may be separated in a single separation zone or separate separation zones may be used for each catalytic cracking zone.

For purposes of illustration, a single separator is shown in the drawing and two streams boiling above the said given temperature as shown. However, it should be understood that the drawing is simply illustrative of one preferred embodiment of the invention.

DETAILED DESCRIPTION OF THE DRAWING

The drawing is a block flow diagram of one embodiment of the process of the present invention. The drawing presupposes that a 400° F.- gasoline product is desired. Not included in the drawing because of their conventional nature are, for example, catalyst regeneration zones as would be required in a moving bed or fluid bed catalytic cracking processes.

A hydrocarbon feedstock boiling above about 400° F. is introduced via Line 1 into First Catalytic Cracking Zone A. First Catalytic Cracking Zone A contains an amorphous silica-alumina catalyst that is substantially free of any hydrogenating component and is also substantially free of any crystalline zeolitic molecular sieve component. The effluent from First Catalytic Cracking Zone A passes via Line 2 to Separator 3, wherein that stream of the effluent boiling below 400° F. is recovered via Line 4 as product. At least a portion of that stream of the effluent of First Catalytic Cracking Zone A which boils above about 400° F. is conducted from Separator 3 via Lines 6 and 7 to Second Catalytic Cracking Zone B. Second Catalytic Cracking Zone B contains a crystalline zeolitic molecular sieve catalyst, which catalyst may also comprise amorphous silica-alumina. The catalyst in the second catalytic cracking zone is substantially free of any hydrogenating components. The effluent from the second catalytic cracking zone passes via Line 8 to Separator 3. That portion of the effluent from the second catalytic cracking zone boiling below about 400° F. is recovered via Line 4 as product. At least a portion of the effluent from the second catalytic cracking zone boiling above about 400° F. is recycled via Lines 6 and 7 to Second Catalytic Cracking Zone B. A portion of the common effluent from the second catalytic cracking zone which boils above about 400° F. can be recovered via Line 5 as a light cycle oil. A portion of the recycle stream passing via Line 6 can be conducted via Line 9 to First Catalytic Cracking Zone A to maintain the proper temperature therein.

The invention will be still better understood by reference to the following example, which is offered by way of illustration and not by way of limitation.

EXAMPLE

A hydrocarbon feedstock boiling in the range of from 650° to 1,000° F. was fed to a cracking zone containing a conventional commercial silica-alumina catalyst. The cracking conditions and products obtained are set forth under Col. 1 in Table I, Part A, below.

In a similar manner, eight additional experimental runs were conducted using the catalysts and operating conditions shown in Table I. The products obtained are also set forth in Table I, Part A. The catalysts used in runs 2–4 were the same as in run No. 1, while in runs 5–9 a conventional commerical zeolite-containing catalyst was used.

From the experimental data obtained in these nine runs, graphical extrapolation and interpolation were used to obtain calculated yields for single-stage cracking. These yields are shown in Table I, Part B.

From these calculated yields for single-stage cracking, obtained by graphical analysis, the yields for: (1) two-stage cracking utilizing zeolite in both stages; and (2) amorphous silica-alumina in the first and zeolite in the second stage were calculated with the results shown in Table I, Part C.

TABLE I

| | PART A<br>EXPERIMENTAL DATA | | | | | | | | | PART B<br>CALCULATED YIELDS FROM SINGLE-STAGE CRACKING | | | | PART C<br>CALCULATED YIELDS FROM 2-STAGE CRACKING | |
|---|---|---|---|---|---|---|---|---|---|---|---|---|---|---|---|
| Column No. | 1 | 2 | 3 | 4 | 5 | 6 | 7 | 8 | 9 | 10 | 11 | 12 | 13 | 14 | 15 |
| Catalyst - Stage 1<br>Stage 2 | ←——Amorphous——→ | | | | ←————Zeolitic————→ | | | | | Amorphous | ←————Zeolitic————→ | | | Zeolitic<br>Zeolitic | Amorphous<br>Zeolitic |
| Feed to Stage 1<br>Stage 2 | ←————————Fresh Feed————————→ | | | | | | | Cycle Oil | Cycle Oil | Fresh Feed | Cycle Oil | ←—Fresh Feed—→ | | ←—Fresh Feed—→<br>←—Cycle Oil—→ | |
| Experiment Number | 1 | 2 | 3 | 4 | 5 | 6 | 7 | 8 | 9 | | | | | | |
| Cracking Conditions | | | | | | | | | | | | | | | |
| Temperature, °F. | ←——————————————925—————————————→ | | | | | | | | ←—975—→ | | | | | | |
| WHSV[1] | 6.06 | 5.95 | 2.97 | 1.43 | 5.68 | 2.93 | 1.45 | 3.04 | 1.47 | | | | | | |
| C/O[2] | 1.98 | 2.02 | 4.04 | 8.42 | 2.11 | 4.09 | 8.24 | 3.95 | 8.17 | | | | | | |
| Conversion, LV%[15] | 50.82 | 56.35 | 58.10 | 70.55 | 60.16 | 69.83 | 81.14 | 60.43 | 69.22 | 50 | 50 | 50 | 75 | 75 | 75 |
| Product Yields, %[3] | | | | | | | | | | | | | | | |
| Coke, Wt.%[10] | 3.01 | 4.17 | 5.43 | 10.44 | 4.30 | 6.96 | 13.69 | 10.2 | 16.64 | 3.1[5] | 5.7[6] | 2.8[7] | 9.2[7] | 5.6[8] | 5.9[9] |
| C₂- Gas, Wt.%[11] | 2.00 | 2.34 | 2.72 | 4.76 | 2.85 | 3.30 | 6.09 | 4.42 | 6.31 | 1.5 | 2.9 | 1.7 | 4.8 | 3.2 | 3.0 |
| Propylene | 5.94 | 7.14 | 7.92 | 9.89 | 5.65 | 5.86 | 6.24 | 5.48 | 5.13 | 6.5 | 5.0 | 4.4 | 6.1 | 6.9 | 9.0 |
| Propane | 1.43 | 1.82 | 2.35 | 4.12 | 3.09 | 5.36 | 9.37 | 4.49 | 7.42 | 1.4 | 2.4 | 2.0 | 6.9 | 3.2 | 2.6 |
| Total C₃'s, LV%[12] | 7.37 | 8.96 | 10.27 | 14.01 | 8.74 | 11.22 | 15.61 | 9.97 | 12.55 | 7.9 | 7.4 | 6.4 | 13.0 | 10.1 | 11.6 |
| Butenes | 6.91 | 7.37 | 7.86 | 8.48 | 4.16 | 4.12 | 3.63 | 3.47 | 3.05 | 7.0 | 3.4 | 3.6 | 4.0 | 5.3 | 8.7 |
| Isobutane | 3.53 | 4.93 | 5.75 | 8.09 | 6.24 | 9.51 | 12.80 | 6.47 | 8.88 | 3.6 | 4.3 | 4.1 | 10.1 | 6.2 | 5.7 |
| n-Butane | 0.79 | 0.99 | 1.24 | 1.81 | 1.94 | 2.95 | 4.26 | 2.22 | 3.22 | 0.7 | 1.3 | 1.3 | 3.2 | 2.0 | 1.4 |
| Total C₄'s, LV%[13] | 11.23 | 12.29 | 14.85 | 18.38 | 12.34 | 16.58 | 20.69 | 12.17 | 15.14 | 11.3 | 9.0 | 9.0 | 17.3 | 13.5 | 15.8 |
| C₅-250°F. Gasoline | 24.92 | 24.40 | 25.33 | 27.09 | 26.88 | 29.72 | 29.83 | 20.49 | 22.09 | 21.1 | 17.5 | 22.7 | 30.6 | 31.5 | 29.9 |
| 250°-430°F. Gasoline | 16.45 | 18.45 | 15.98 | 15.11 | 20.49 | 20.53 | 16.49 | 15.83 | 12.26 | 17.4 | 18.6 | 19.2 | 19.0 | 28.5 | 26.7 |
| Total C₅-430°F. Gasoline, LV%[14] | 41.37 | 42.85 | 41.31 | 42.20 | 47.37 | 50.25 | 46.32 | 36.32 | 34.35 | 38.5 | 36.1 | 41.9 | 49.6 | 60.0 | 56.6 |

[1] Weight hourly space velocity, parts by weight of feed per part by weight of catalyst in cracking zone per hour.

[2] Catalyst-to-oil ratio, parts by weight of catalyst per part by weight of oil.

[3] For two-stage examples based on feed to the first stage.

[4] Composited unconverted 430°F.+ cycle oil from experiments No. 1, 2 and 3.

[5] Product yields in Col. 10 obtained by graphical extrapolation of data from experimental data in Cols. 1, 2, and 3.

[6] Product yields in Col. 11 obtained by graphical extrapolation of data from experimental data in Cols. 8 and 9.

[7] Product yields in Cols. 12 and 13 obtained by graphical interpolation and extrapolation of data from experimental data in Cols. 5, 6 and 7.

[8] Product yields in Col. 14 obtained by calculation from Cols. 11 and 12.

[9] Product yields in Col. 15 obtained by calculation from Cols. 10 and 11.

[10] Calculated yields of coke under Cols. 10, 11, 12 and 13 were obtained by plotting on semi-log paper the data re coke vs. percent conversion taking values from the best-fitting linear curve.

[11] Calculated yields of C₂ and lighter gas under Cols. 10, 11, 12 and 13 were obtained by plotting on semi-log paper the data re C₂ gas vs. percent conversion taking values from the best-fitting linear curve.

[12] Calculated total yields of C₃ gases under Cols. 10, 11, 12 and 13 were obtained by plotting on semi-log paper the data re total C₃ gases vs. percent conversion taking the values from the best-fitting linear curve. Calculated yields for propylene were obtained by plotting on linear graph paper percent propylene in the C₃ fraction vs. percent conversion taking the values from the best-fitting linear curve. The values for propane under Cols. 10, 11, 12 and 13 were obtained by the difference between the total C₃ gases and the values calculated for propylene.

[13] Calculated total yields of C₄ gases under Cols. 10, 11, 12 and 13 were obtained by plotting on log-log paper the data re total C₄'s vs. percent conversion and taking values from the best-fitting linear curve. Calculated yields for butenes were then obtained by plotting on linear graph paper the percent butenes in the C₄ fraction vs. percent conversion. Similarly, the values for isobutane were obtained by plotting on linear graph paper the data re percent isobutane in the C₄ fraction vs. percent conversion taking the values from the best-fitting linear curves. The values for n-butane were then obtained by difference.

[14] The total C₅-430°F. gasoline in Cols. 10, 11, 12 and 13 was obtained by subtracting (1) the lighter products and (2) the coke from the total material converted. The C₅-250°F. gasoline was obtained by plotting the percent C₅-250°F. gasoline in total C₅-430°F. gasoline vs. percent conversion on linear graph paper and taking values from the best-fitting linear curve. The 250°-430°F. gasoline yields were then obtained by difference.

[15] 100 - LV% 430°F.+ cycle oil.

The following analysis of the data in Table I can be made:

I. Comparison of Cols. 13 vs. 15 shows the advantages of a two-stage, two-catalyst operation over single-stage zeolite operation at same over-all conversion:

| | | | |
|---|---|---|---|
| Coke | 9.2–5.9/9.2 | = | 36% decrease |
| C₂ gas | 4.8–3.0/4.8 | = | 37% decrease |
| C₃ olefins | 9.0–6.1/6.1 | = | 47% increase |
| C₄ olefins | 8.7–4.0/4.0 | = | 117% increase |
| Gasoline | 56.6–49.6/49.6 | = | 14% increase |

II. Two-stage — both zeolite (Col. 14) vs. two-stage — amorphous/zeolite (Col. 15)

| | | | | | |
|---|---|---|---|---|---|
| Coke | 5.6 | vs. | 5.9 | | |
| C₂ gas | 3.2 | vs. | 3.0 | | |
| C₃ olefins | 6.9 | → | 9.0 | 2.1/6.9 | = 30% increase |
| C₄ olefins | 5.3 | → | 8.7 | 3.4/5.3 | = 64% increase |
| Gasoline | 60.0 | → | 56.6 | 3.4/60.0 | = 5.7% decrease |

Since it is apparent that many widely different embodiments of this invention may be made without departing from the scope and spirit thereof, it is therefore not intended to be limited except as indicated in the appended claims.

What is claimed is:

1. A process for producing increased yield of catalytically cracked product, comprising:
    a. contacting a hydrocarbon feedstock boiling above about 400° F. with a first catalyst comprising amorphous silica-alumina, said first catalyst being substantially free of any hydrogenating component and substantially free of any crystalline zeolitic molecular sieve component, in a first catalytic cracking zone at catalytic cracking conditions sufficiently severe to convert from about 15 percent to about 75 percent of said feedstock to lower-boiling products,
    b. separating the effluent from said first catalytic cracking zone into at least a stream boiling below a given temperature and a stream boiling above said given temperature;
    c. contacting at least a portion of said stream boiling above said given temperature with a second catalyst comprising a crystalline zeolitic molecular sieve component, said second catalyst being substantially free of any hydrogenating component, in a second catalytic cracking zone at catalytic cracking conditions; and
    d. recovering those portions of the effluents from said first and second catalytic cracking zones boiling below said given temperature,
    said given temperature being in the range of from about 250° to about 460° F.

2. A process as in claim 1, wherein at least a portion of that part of the effluent from said second catalytic cracking zone boiling above said given temperature is recycled to said second catalytic cracking zone.

3. A process as in claim 2, wherein said second catalyst further comprises an amorphous silica-alumina component.

4. A process as in claim 3, wherein said zeolitic molecular sieve component and said amorphous silica-alumina component of said second catalyst are present in amounts of 1 to 30 weight percent and 70 to 99 weight percent respectively, said weight percents being based on total second catalyst weight.

5. A process as in claim 2, wherein the catalytic cracking conditions in both the first catalytic cracking zone and the second catalytic cracking zone include a temperature within the range from about 700° F. to about 1,250° F., a pressure within the range from about 1 psig to about 100 psig, and a liquid hourly space velocity within the range from about 0.5 to about 50.

6. A process as in claim 5, wherein the temperature of said first catalytic cracking zone is higher than the temperature of said second catalytic cracking zone.

7. A process as in claim 2, wherein the catalytic cracking conditions in the first catalytic cracking zone are sufficiently severe to convert from about 25 percent to about 65 percent of the feedstock to lower-boiling products.

8. A process as in claim 1, wherein said given temperature is in the range 275° to 425° F.

9. A process as in claim 2, wherein a portion of the effluent from the second catalytic cracking zone which boils above about 400° F. is recovered as a cycle oil.

10. A process as in claim 2, wherein said first catalytic cracking zone is operated on substantially a once-through basis.

* * * * *

PO-1050
(5/69)

UNITED STATES PATENT OFFICE
CERTIFICATE OF CORRECTION

Patent No. 3,803,024              Dated  April 9, 1974

Inventor(s)  Willard M. Haunschild

It is certified that error appears in the above-identified patent and that said Letters Patent are hereby corrected as shown below:

Item 45, "Sept. 4, 1974" should read --April 9, 1974--.

Col. 1, line 12, "knwon" should read --known--.

Col. 2, line 26, "THE CRACKING conditions" should read --THE CRACKING CONDITIONS--.

Col. 3, line 41, "cracking" should read --cracked--.

Claim 1, Col. 9, line 26, "lt" should read --1.--.

Signed and sealed this 13th day of August 1974.

(SEAL)
Attest:

McCOY M. GIBSON, JR.                C. MARSHALL DANN
Attesting Officer                   Commissioner of Patents